(12) United States Patent
Kasprzyk et al.

(10) Patent No.: US 12,422,017 B2
(45) Date of Patent: Sep. 23, 2025

(54) HYDRAULIC DAMPER WITH A HYDRAULIC COMPRESSION STOP ASSEMBLY

(71) Applicant: BeijingWest Industries Co., Ltd., Beijing (CN)

(72) Inventors: Dominik Kasprzyk, Debica (PL); Mateusz Sarapata, Wysoka (PL)

(73) Assignee: Beijing West Industries Co., Ltd., Beijing (CN)

( * ) Notice: Subject to any disclaimer, the term of this patent is extended or adjusted under 35 U.S.C. 154(b) by 331 days.

(21) Appl. No.: 17/942,118

(22) Filed: Sep. 10, 2022

(65) Prior Publication Data
US 2023/0117340 A1  Apr. 20, 2023

(30) Foreign Application Priority Data

Oct. 15, 2021  (CN) .......................... 202111201930.X

(51) Int. Cl.
*F16F 9/58*  (2006.01)
*B60G 13/08*  (2006.01)
(Continued)

(52) U.S. Cl.
CPC .............. *F16F 9/585* (2013.01); *B60G 13/08* (2013.01); *B60G 17/08* (2013.01); *F16F 9/185* (2013.01);
(Continued)

(58) Field of Classification Search
CPC .......... F16F 9/585; F16F 9/185; F16F 9/3488; F16F 2222/12; F16F 2228/066;
(Continued)

(56) References Cited

U.S. PATENT DOCUMENTS 2,559,633 A     7/1951  Katz
2,695,079 A  *  11/1954 Brundrett .................. F16F 9/48
                                                            188/315
(Continued)

FOREIGN PATENT DOCUMENTS

CN          104246285 A      12/2014
CN          108006145 A       5/2018
(Continued)

OTHER PUBLICATIONS

Extended European Search Report issued on Mar. 24, 2023 for counterpart European patent application No. 22201148.8.
(Continued)

*Primary Examiner* — Christopher P Schwartz
(74) *Attorney, Agent, or Firm* — William H. Honaker; Dickinson Wright PLLC

(57) ABSTRACT

The present disclosure relates to a hydraulic damper comprising a main tube, a piston assembly, a base valve assembly, and at least one hydraulic compression stop assembly cooperating with a compression valve assembly, and comprising a pin disposed slidably within the piston rod and biased to project an activating tip towards the compression chamber. Said compression valve assembly comprises at least one deflectable or floating disc covering compression flow passages, and biased by a piston member slidable along said axis and normally abutting a retaining surface, and a pressure chamber having one surface defined by a surface of said piston member abutting said retaining surface, wherein said pin upon sliding inside the piston rod facilitates a flow of the working liquid from the compression chamber into said pressure chamber to increase biasing load on said at least one deflectable or floating disc.

10 Claims, 4 Drawing Sheets

(51) Int. Cl.
*B60G 17/08* (2006.01)
*F16F 9/18* (2006.01)
*F16F 9/348* (2006.01)

(52) U.S. Cl.
CPC ........ *F16F 9/3488* (2013.01); *B60G 2202/24* (2013.01); *B60G 2204/45* (2013.01); *B60G 2206/41* (2013.01); *B60G 2500/11* (2013.01); *B60G 2800/162* (2013.01); *F16F 2222/12* (2013.01); *F16F 2228/066* (2013.01); *F16F 2230/007* (2013.01); *F16F 2232/08* (2013.01); *F16F 2234/02* (2013.01)

(58) Field of Classification Search
CPC ............. F16F 2230/007; F16F 2232/08; F16F 2234/02; B60G 13/08; B60G 2202/24; B60G 2204/45; B60G 2206/41; B60G 2500/11; B60G 2800/162
USPC .... 188/282.5, 282.8, 322.14, 322.15, 322.22
See application file for complete search history.

(56) References Cited

U.S. PATENT DOCUMENTS

| | | | | |
|---|---|---|---|---|
| 4,474,271 | A * | 10/1984 | Molders | B61K 7/025 |
| | | | | 188/62 |
| 4,588,053 | A * | 5/1986 | Foster | F16F 9/3482 |
| | | | | 188/282.1 |
| 5,655,633 | A | 8/1997 | Nakadate et al. | |
| 5,680,913 | A * | 10/1997 | Wood | F15B 15/222 |
| | | | | 188/289 |
| 6,776,269 | B1 * | 8/2004 | Schel | F16F 9/483 |
| | | | | 188/316 |
| 8,333,270 | B2 * | 12/2012 | Ji | F16F 9/5126 |
| | | | | 188/320 |
| 8,991,571 | B2 | 3/2015 | Murakami | |
| 9,139,065 | B2 | 9/2015 | Yamashita et al. | |
| 10,752,076 | B2 * | 8/2020 | Knapczyk | F16F 9/48 |
| 2019/0375263 | A1 | 12/2019 | Knapczyk et al. | |

FOREIGN PATENT DOCUMENTS

| | | |
|---|---|---|
| CN | 108050195 A | 5/2018 |
| CN | 108757811 A | 11/2018 |
| CN | 109404472 A | 3/2019 |
| CN | 110486406 A | 11/2019 |
| DE | 1028438 B | 7/1956 |
| DE | 102018211516 A1 | 1/2020 |
| EP | 1050696 A2 | 11/2000 |
| EP | 1647721 A1 | 4/2006 |
| GB | 593954 A | 10/1947 |
| JP | 5012484 A | 2/1975 |
| JP | 02195038 A | 8/1990 |
| JP | 08135714 A | 5/1996 |
| JP | 2011027255 A | 2/2011 |
| JP | 2014231879 A | 12/2014 |
| SU | 1135934 A1 | 1/1985 |

OTHER PUBLICATIONS

The First Office Action and search report issued on Nov. 15, 2022 for counterpart Chinese patent application No. 202111201930.X, along with machine EN translation downloaded from EPO.

Xu Tongle et al., Development of Hydraulic Buffers, Mining Machinery 2000.5.

Supplemental search report issued on Dec. 23, 2022 for counterpart Chinese patent application No. 2021112019200X with machine EN translation.

* cited by examiner

HYDRAULIC DAMPER WITH A HYDRAULIC COMPRESSION STOP ASSEMBLY

CROSS-REFERENCE TO RELATED APPLICATIONS

This application claims priority to Chinese Patent Application No. 202111201930.X, filed on Oct. 15, 2021, which is hereby incorporated by reference in its entirety.

FIELD OF THE INVENTION

The present disclosure relates to a hydraulic damper, in particular a motor vehicle suspension damper, comprising a main tube filed with working liquid; a piston assembly disposed slidably inside the main tube along an axis, attached to a piston rod led outside the damper through a sealed piston rod guide, dividing the tube into a rebound chamber and a compression chamber, provided with compression and rebound valve assemblies to control the flow of the working liquid passing between the rebound chamber and the compression chamber; a base valve assembly located at the end of the compression chamber, provided with compression and rebound valve assemblies to control the flow of the working liquid passing between the compression chamber and a compensation chamber; and at least one hydraulic compression stop assembly to increase damping forces at the end of the damper compression stroke, cooperating with a compression valve assembly and comprising a pin disposed slidably within the piston rod and biased to project an activating tip towards the compression chamber to increase damping of said compression valve assembly upon sliding inside the piston rod.

BACKGROUND OF THE INVENTION

Document JP2014231879 discloses a twin-tube hydraulic damper comprising a hydraulic stop assembly comprising a pin inserted into a chamber of a piston and having one end fixed to a base valve assembly and the other end side inserted into the piston rod. The pin has a support flange portion supported by the base valve and a large diameter shaft portion having a constant diameter smaller than that of the support flange portion, and a tapered shaft portion extending in the axial direction from the side opposite to the support flange portion. The orifice in the form of the gap between the small diameter hole of the tip rod and the pin is provided on the lower chamber side in the passage in the rod, having the narrowest passage area when the large-diameter shaft portion is aligned with the small-diameter hole portion in the axial direction, and the widest passage area when the small-diameter shaft portion is aligned with the small-diameter hole portion in the axial direction. The small-diameter hole and the pin change the passage area according to the displacement of the piston rod forming the passage area adjusting mechanism aligning the small diameter hole portion with the axial position of the small diameter shaft portion of the pin to maximize the passage area of the orifice.

As a compression stop assembly requires space for its operation, it is common to provide this space by decreasing a so called minimum bearing span of a damper that is the distance between a rebound stop and a main piston assembly. However this may exclude implementations of such dampers in suspension systems where piston rod is subjected to side loads (e.g. MacPherson struts), where a sufficient minimum bearing span is crucial for proper operation of the damper. It is thus desirable to reduce the space occupied by the compression stop assembly at the end of the damper compression stroke. Such a space reduction is also beneficial in terms of packaging and handling of the dampers.

It has been the object of the present disclosure to provide a hydraulic damper with a compression stop assembly, which would reduce operational length of the assembly, would be cost efficient and simple in manufacture and assembly, and which would provide versatile tuning properties for shaping the additional damping force.

SUMMARY OF THE INVENTION

The present invention provides a hydraulic damper. The hydraulic damper comprises a main tube filed with working liquid and extending along an axis between an open end and a closed end. The hydraulic damper also comprises a piston assembly slidably disposed inside the main tube, attached to a piston rod that extends outside the hydraulic damper through a sealed piston rod guide located at the open end, dividing the main tube into a rebound chamber and a compression chamber and configured to generate a damping force. The hydraulic damper also comprises a base valve assembly located at the closed end of the compression chamber and configured to control a flow of the working liquid between the compression chamber and a compensation chamber. The hydraulic damper also comprises at least one compression stop assembly cooperating with a compression valve assembly and comprising a pin disposed slidably within the piston rod and biased to project an activating tip towards the compression chamber to increase damping of said compression valve assembly upon sliding inside the piston rod and to generate an additional damping force with said piston assembly at an end of a compression stroke. The compression valve assembly comprises: at least one deflectable or floating disc covering compression flow passages and biased by a piston member slidable along said axis and abutting a retaining surface. The compression valve assembly also comprises a pressure chamber having one surface defined by a surface of said piston member abutting said retaining surface. The pin, upon sliding inside the piston rod, facilitates a flow of the working liquid from the compression chamber into said pressure chamber to generate a pressure on said surface of said piston member to increase a biasing load on said at least one deflectable or floating disc.

The present disclosure provides a damper having a compression valve assembly that comprises at least one deflectable or floating disc covering compression flow passages, and biased by a piston member slidable along said axis and normally abutting a retaining surface, and a pressure chamber having one surface defined by a surface of said piston member abutting said retaining surface, wherein said pin, upon sliding inside the piston rod, facilitates a flow of the working liquid from the compression chamber into said pressure chamber to generate a pressure on said surface of said piston member to increase biasing load on said at least one deflectable or floating disc.

In some embodiments, said compression valve assembly comprises at least one spring having a first surface biasing said at least one deflectable or floating disc, and a second surface biasing said piston member.

Therefore, in some embodiments, the piston member compresses the spring and increases its biasing load.

In some embodiments, said compression valve assembly cooperating with said at least one hydraulic compression stop assembly is a compression valve assembly of the piston assembly, and said pressure chamber is additionally defined by a guiding portion fixed on the piston rod, wherein the piston rod has at least one radial channel in fluid communication with said pressure chamber and normally disconnected from the compression chamber by the wall of the pin, wherein the pin has at least one axial channel in fluid communication with the compression chamber having an outlet distal to the activating tip of the pin normally closed by the wall of the piston rod, wherein upon sliding of the pin inside the piston rod along a predetermined distance said at least one axial channel of the pin is in fluid communication with said at least one radial channel of the piston rod to generate pressure on said surface of said piston member.

In some embodiments, said at least one axial channel has a form of a narrowed cross-section of said pin.

In some embodiments, said compression valve assembly cooperating with said at least one hydraulic compression stop assembly is installed within an adapter disposed between the base valve assembly and the compression chamber and comprising an axial opening for a flow of the working liquid through the base valve assembly between the compression chamber and the compensation chamber which is closable by the activating tip of the pin, and said pressure chamber is additionally defined by a guiding portion of said adapter, wherein the adapter has at least one radial channel in fluid communication with said pressure chamber and normally connected with the compression chamber, wherein said compression flow passages are disposed within a valve member fixed between said adapter and the main tube, wherein closing said axial opening by the activating tip and sliding of the pin inside the piston rod along a predetermined distance generates pressure on said surface of said piston member.

In some embodiments, said adapter comprises a number of axial flow passages surrounding said guiding portion, and said valve member has a number of rebound flow passages covered in the compression chamber by at least one deflective or floating intake disk provided with a number of flow passages that allow the working liquid to flow to said compression flow passages during the compression stroke of the damper.

In some embodiments, the pin is biased by a spring disposed within a chamber in the piston rod.

In some embodiments, the pin has an internal axial channel joining the compression chamber with said chamber in the piston rod.

BRIEF DESCRIPTION OF THE DRAWINGS

The disclosure shall be described and explained below in connection with the attached drawings on which.

DETAILED DESCRIPTION

Figure 1:
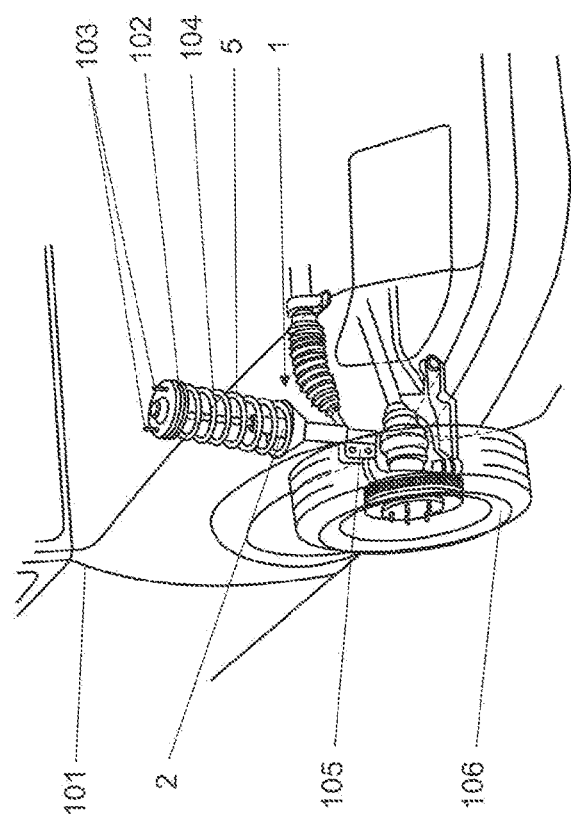
FIG. 1 illustrates a fragment of a vehicle suspension comprising a damper according to the present disclosure.

FIG. 1 schematically illustrates a fragment of an exemplary vehicle suspension comprising a damper 1 of the present disclosure attached to a vehicle chassis 101 by means of a top mount 102 and a number of screws 103 disposed on the periphery of the upper surface of the top mount 102. The top mount 102 is connected to a coil spring 104 and a piston rod 5 of the damper 1. The tube 2 of the damper 1 is connected to the steering knuckle 105 supporting the vehicle wheel 106.

Figure 2:
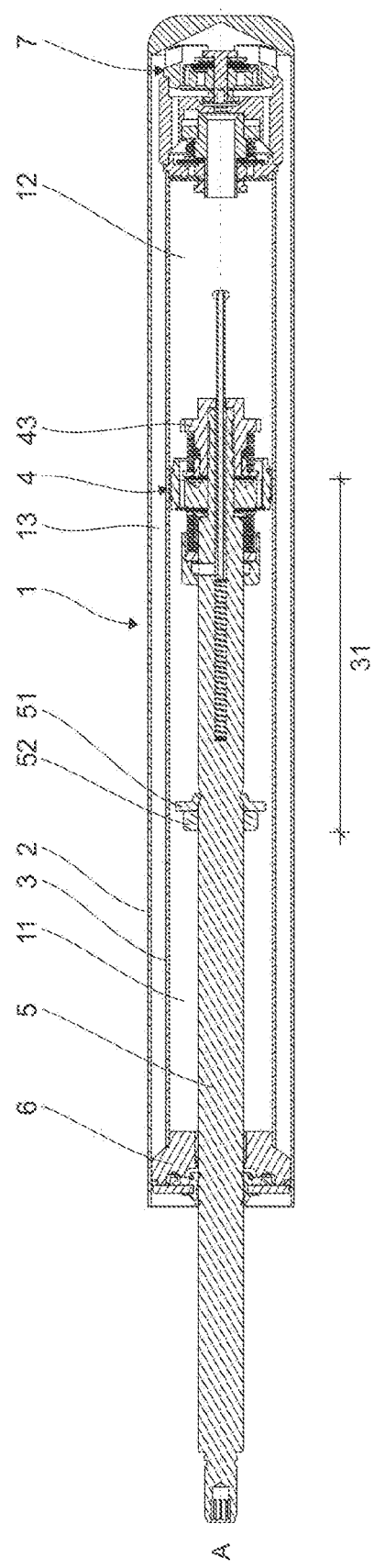
FIG. 2 is a schematic cross-sectional view of an embodiment of a twin-tube damper according to the present disclosure.

FIG. 2 presents an embodiment of a twin-tube damper 1 according to the present disclosure. The damper 1 comprises an external tube 2 and a main tube 3 filled with viscous working liquid inside of which a movable piston assembly 4 is disposed. The piston assembly 4 is attached to the piston rod 5 led outside the damper 1 through a sealed piston rod guide 6 by means of a shoulder nut 43. The damper 1 is also provided with a base valve assembly 7 fixed at the other end of the main tube 3. The piston assembly 4 makes a sliding fit with the inner surface of the main tube 3 and divides the tube 3 into a rebound chamber 11 (between the piston assembly 4 and the piston rod guide 6) and a compression chamber 12 (between the piston assembly 4 and the base valve assembly 7). A compensation chamber 13 is located at the other side of the base valve assembly 7. A metal rebound stop 51 is clenched on a piston rod 5 and supports an elastomeric rebound bumper 52. The distance between the rebound bumper 52 and the piston assembly 4 defines a minimum bearing span 31 of the damper 1.

The term "compression" as used herein with reference to particular elements of the damper refers to these elements or parts of elements which are adjacent to or face the compression chamber 12 or, in a case of the working liquid flow direction, it refers to this flow direction that takes place during the compression stroke of the damper. Similarly the term "rebound" as used in this specification with reference to particular elements of the damper refers to these elements or these parts of particular elements which are adjacent to or face the rebound chamber 11 or, in a case of the working liquid flow direction, it refers to this flow direction that takes place during the rebound stroke of the damper.

Figure 3:
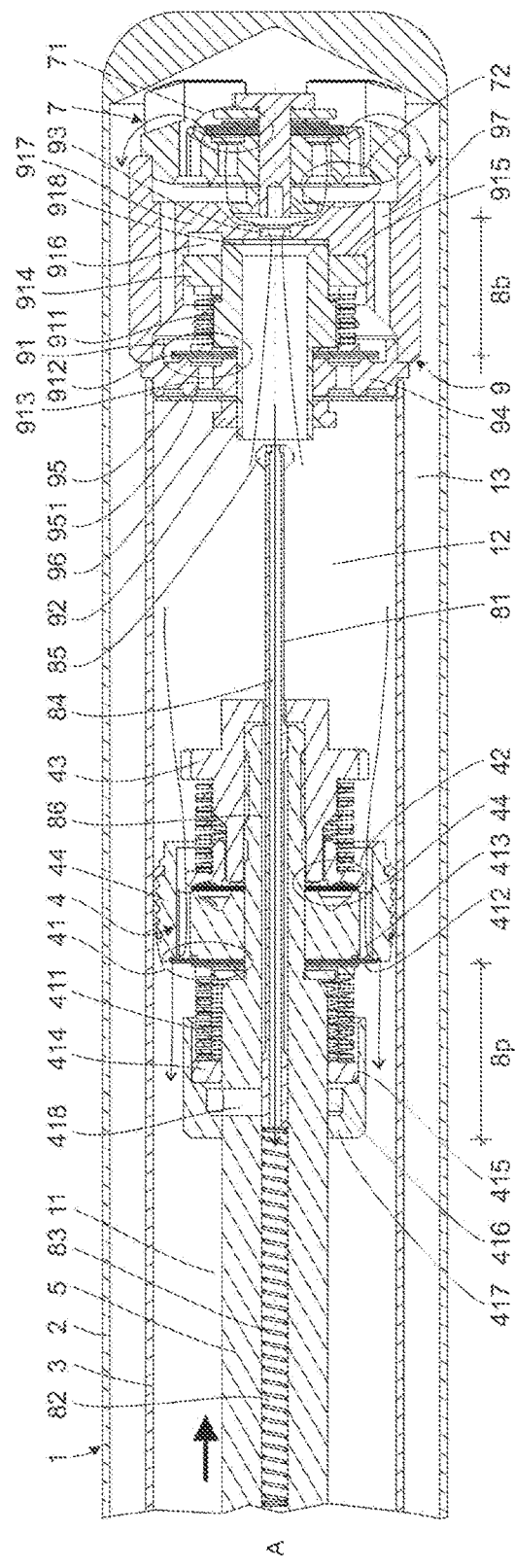
FIG. 3 is a schematic cross-sectional enlarged view of the damper shown in FIG. 2 illustrating both a hydraulic compression stop piston assembly and a hydraulic compression stop base valve assembly in an inactive state during the compression stroke.

As shown in FIG. 3 the piston assembly 4 includes a first compression valve assembly 41 and a first rebound valve assembly 42. Each of the first compression and first rebound valve assemblies 41, 42 are configured to control the flow of working liquid passing between the rebound chamber 11 and the compression chamber 12 while the piston assembly 4 is in motion along an axis A and to generate a damping force opposing force applied to the piston rod 5 in corresponding compression and rebound directions. Also, the base valve assembly 7 includes a second compression valve assembly 71 and a second rebound valve assembly 72 to control the flow of working liquid passing between the compensation chamber 13 and the compression chamber 12, respectively, during rebound and compression stroke of the hydraulic damper 1. As it is well known to those skilled in the art, the valve assemblies 41, 42 and 71, 72 provide design parameters that may be used to shape desired characteristics of the hydraulic damper 1.

The damper 1 is further provided with two compression stop assemblies 8p and 8b to generate an additional damping force at the end of the compression stroke e.g. in order to avoid abrupt stop of the piston assembly 4. An activating component of both compression stop assemblies 8p and 8b is a pin 81 disposed slidably within an internal chamber 82 of the piston rod 5. The pin 81 is biased to project from the piston rod 5 towards the compression chamber 12 by a spring 83 disposed within the internal chamber 82. The pin 81 has an internal axial channel 84 joining the compression chamber 12 with the internal chamber 82 to provide venting and lubrication.

The compression stop assembly 8p is installed on the piston assembly 4 and cooperates with the first compression valve assembly 41 of the piston assembly 4. The first compression valve assembly 41 has a spring 411 having a first surface biasing four deflectable discs 412 covering compression flow passages 413 in the body 44 of the piston assembly 4. A second surface of the spring 411 biases a piston member 414 surrounding the piston rod 5 and slidable along the axis A. In an inactive state of the compression stop assembly 8p the piston member 414 abuts a retaining surface 415 of a guiding portion 417 fixed on the piston rod 5. The guiding portion 417 and the surface of the piston member 414 distal to the spring 411 define a pressure chamber 416. The piston rod 5 is provided with a number of equiangularly spaced radial channels 418 that may join the pressure chamber 416 with the compression chamber 12, as shall be explained later.

The base compression stop assembly 8b is installed on an adapter 9 fixed to the base valve assembly 7 and cooperates with a third compression valve assembly 91 of the adapter 9. The third compression valve assembly 91 has a spring 911 having a first surface biasing three deflectable discs 912 covering compression flow passages 913 in an annular valve member 94 fixed between the adapter 9 and the main tube 3. A second surface of the spring 911 biases a piston member 914 surrounding a sleeve member 92 and slidable along the axis A. The adapter 9 is further provided with a guiding portion 917 surrounding the piston member 914. In an inactive state of the base compression stop assembly 8b, the piston member 914 abuts a retaining surface 915 of the guiding portion 917. The guiding portion 917 and the surface of the piston member 914 distal to the spring 911 define a pressure chamber 916. The adapter 9 is provided with a number of equiangularly spaced radial channels 918 joining the pressure chamber 916 with the compression chamber 12. The sleeve member 92 passes through deflectable discs 912, the valve member 94, and an intake disk 95 and is fixed to the valve member 94 by a securing nut 96. The intake disk 95 is provided with a number of flow passages 951 that allow the working liquid to flow to the compression flow passages 913. The adapter is provided with an axial opening 93, that allows the working liquid to flow between the compression chamber 12 and the compensation chamber 13 that may be closed by an activating tip 85 of the pin 81, as shall be explained later.

Figure 5:
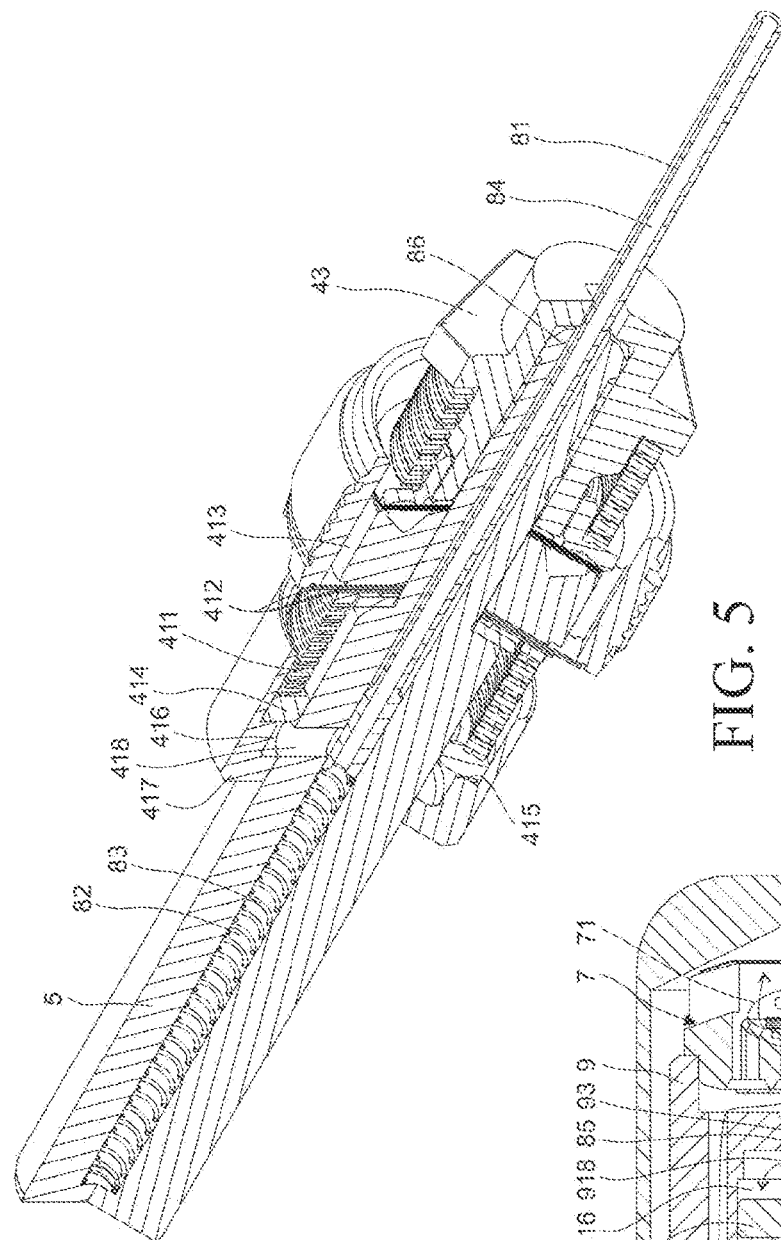
FIG. 5 is a schematic cross-sectional, perspective view of the hydraulic compression stop piston assembly shown in FIG. 2 in an inactive state.

The pin 81 has an axial, annular channel 86 in fluid communication with the compression chamber 12 having an outlet distal to the activating tip 85 of the pin 81 normally closed by the wall of the piston rod 5. As shown in FIG. 3 and FIG. 5, in an inactive state of the compression stop assembly 8p, during the compression stroke of the damper 1, the axial channel 86, and thus also radial channels 418 are closed by the wall of the pin 81 and the working liquid flows, as indicated by arrows, from the compression chamber 12 to the rebound chamber 11 through the first compression valve assembly 41 of the piston assembly 4. In this configuration of the piston assembly 4 the spring 411 has a maximum working length and thus generates a predefined minimum pressure on the stack of deflectable discs 412 of the first compression valve assembly 41.

Figure 7:
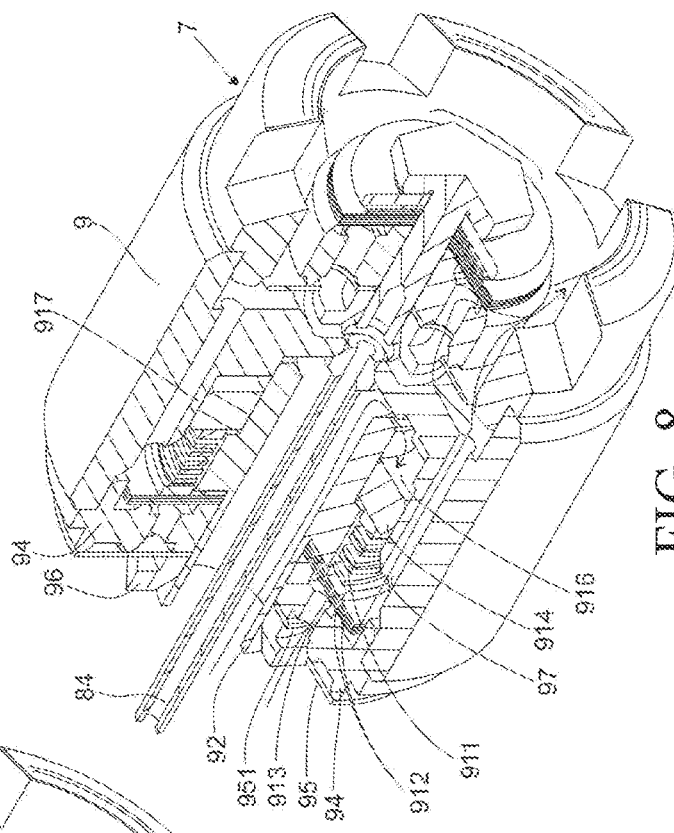
FIG. 7 is a schematic cross-sectional, perspective view of the hydraulic compression stop base valve assembly shown in FIG. 2 in an inactive state.

Similarly, as shown in FIGS. 3 and 7, in an inactive state of the base compression stop assembly 8b, during the compression stroke of the damper 1, radial channel 918 of the adapter 9 is open but the pressure in the pressure chamber 916 is not generated, as the working liquid flows, as indicated by arrows, between the compression chamber 12 and the compensation chamber 13 through a sleeve member 92, the axial opening 93 of the adapter 9 and the second compression valve assembly 71 of the base valve assembly 7.

Each of the compression stop assemblies 8p, 8b cooperates with a corresponding valve assembly 41, 91. The piston compression stop assembly 8p cooperates with the first compression valve assembly 41, and the base compression stop assembly 8b cooperates with the third compression valve assembly 91.

Figure 6:
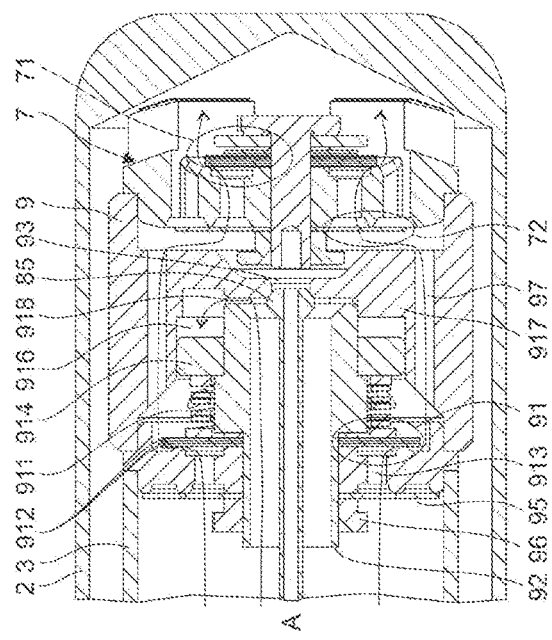
FIG. 6 is a schematic cross-sectional view of the hydraulic compression stop base valve assembly shown in FIG. 2 after activation.
Figure 8:
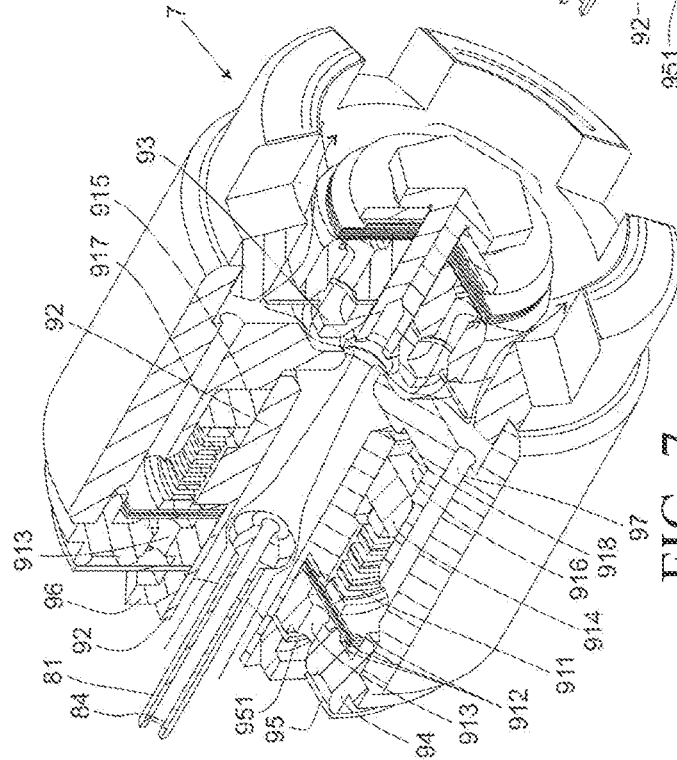
FIG. 8 is a schematic cross-sectional, perspective view of the hydraulic compression stop base valve assembly shown in FIG. 2 after activation.
Figure 9:
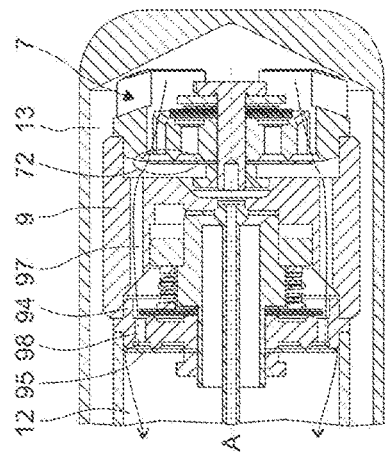
FIG. 9 is a schematic cross-sectional view of the hydraulic compression stop base valve assembly shown in FIG. 2 in active state, and at the onset of the rebound stroke of the damper.

As shown in FIGS. 6, 8, and 9 at a certain position of the compression stroke the activating tip 85 of the pin 81 closes the axial opening 93 of the adapter and slides inside the piston rod 5 activating both the piston compression stop assembly 8p and the base compression stop assembly 8b.

Figure 4:
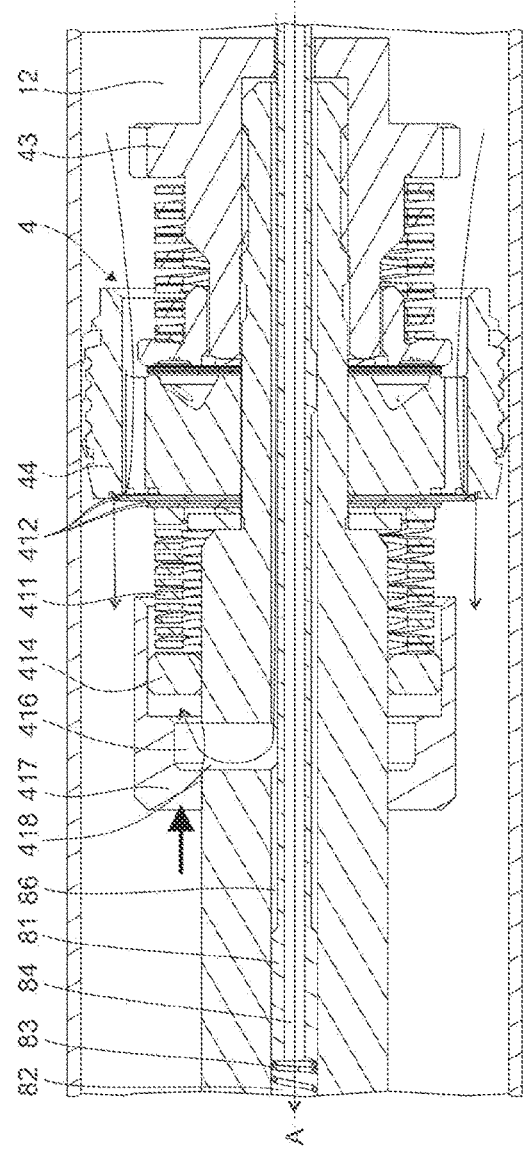
FIG. 4 is a schematic cross-sectional view of the hydraulic compression stop piston assembly shown in FIG. 2 after activation.

As shown in FIG. 4, in the active state of the compression stop piston assembly 8p the pin 81 slides inside the internal chamber 82 of the piston rod 5 connecting the pressure chamber 416 with the compression chamber 12 through the axial channel 86 of the pin 81 and the radial channels 418 in the piston rod 5. Increased pressure in the pressure chamber 416 forces the piston member 414 to slide about the piston rod 5 and to compress the spring 411. This increases the reaction of the spring 411 and progressively increases the pressure on the stack of deflectable discs 412 of the first compression valve assembly 41. Therefore damping force generated by the first compression valve assembly 41 of the piston assembly 4 progressively increases.

As shown in FIGS. 6, and 8, in the active state of the base compression stop assembly 8b, the axial opening 93 of the adapter 9 is closed and the working liquid flows, as indicated by arrows, to the pressure chamber 916 through the radial channels 918. Increased pressure in the pressure chamber 916 forces the piston member 914 to slide about the sleeve member 92 and to compress the spring 911. This increases the reaction of the spring 911 and progressively increases the pressure on the stack of deflectable discs 912 of the third compression valve assembly 91. As indicated by arrows in the active state of the compression stop base valve assembly 8b the working liquid flows from the compression chamber 12 to the compensation chamber 13 through the flow passages 951 in the intake disk 95, compression flow passages 913 in the valve member 94, gap between the valve member 94 and the stack of deflectable discs 912 and finally to the second compression valve assembly 71 of the base valve assembly 7, through a number of equiangularly spaced axial flow passages 97 surrounding the guiding portion 917 of the adapter 9.

As shown in FIG. 9, at the onset of the rebound stroke, when the axial opening 93 of the adapter 9 is closed, the working liquid flows initially from the compensation chamber 13 to the compression chamber 12 through the second rebound valve assembly 72 of the base valve assembly 7, then through flow passages 97 and finally through a number of equiangularly spaced, radially distal rebound flow passages 98 provided in the valve member 94, deflecting the intake disk 95. When the piston assembly 4 moves into the rebound chamber 11, the pin 81 biased by the spring 83 slides outside the piston rod 5, and eventually the activating tip 85 opens the axial opening 93 in the adapter 9.

The above embodiments of the present disclosure are merely exemplary. The figures are not necessarily to scale, and some features may be exaggerated or minimized. These and other factors however should not be considered as limiting the spirit of the disclosure, the intended scope of protection of which is indicated in appended claims.

LIST OF REFERENCE NUMERALS 1. damper
11. rebound chamber
12. compression chamber
13. compensation chamber
2. external tube
3. main tube
31. minimum bearing span
4. piston assembly
41. first compression valve assembly
411. spring
412. deflectable disc
413. compression flow passage
414. piston member
415. retaining surface
416. pressure chamber
417. guiding portion
418. radial channel
42. first rebound valve assembly
43. shoulder nut
44. body
5. piston rod
51. rebound stop
52. rebound bumper
6. piston rod guide
7. base valve assembly
71. second compression valve assembly
72. second rebound valve assembly
8b. base compression stop assembly
8p. piston compression stop assembly
81. pin
82. internal chamber
83. spring
84. internal axial channel
85. activating tip
86. axial channel
9. adapter
91. third compression valve assembly
911. spring
912. deflectable disc
913. compression flow passage
914. piston member
915. retaining surface
916. pressure chamber
917. guiding portion
918. radial channel
92. sleeve member
93. axial opening
94. valve member
95. intake disk
951. flow passage
96. securing nut
97. flow passage
98. rebound flow passage
101. vehicle chassis
102. top mount
103. screw
104. spring
105. steering knuckle
106. vehicle wheel

What is claimed is:

1. A hydraulic damper, comprising:
a main tube filled with working liquid and extending along an axis between an open end and a closed end;
a piston assembly slidably disposed inside the main tube, attached to a piston rod that extends outside the hydraulic damper through a sealed piston rod guide located at the open end, dividing the main tube into a rebound chamber and a compression chamber and configured to generate a damping force;
a base valve assembly located at the closed end of the compression chamber and configured to control a flow of the working liquid between the compression chamber and a compensation chamber; and
at least one compression stop assembly cooperating with a compression valve assembly and comprising a pin disposed slidably within the piston rod and biased to project an activating tip towards the compression chamber to increase damping of said compression valve assembly upon sliding inside the piston rod and to generate an additional damping force with said piston assembly at an end of a compression stroke;
wherein said compression valve assembly comprises:
at least one deflectable or floating disc covering compression flow passages and biased by a piston member slidable along said axis and abutting a retaining surface, and
a pressure chamber having one surface defined by a surface of said piston member abutting said retaining surface; and
wherein said pin, upon sliding inside the piston rod, facilitates a flow of the working liquid from the compression chamber into said pressure chamber to generate a pressure on said surface of said piston member to increase a biasing load on said at least one deflectable or floating disc.

2. The hydraulic damper according to claim 1, wherein the piston assembly includes compression and rebound valve assemblies to control the flow of working liquid passing between the rebound chamber and the compression chamber to generate the damping force.

3. The hydraulic damper according to claim 1, wherein said compression valve assembly comprises at least one spring having a first surface biasing said at least one deflectable or floating disc, and a second surface biasing said piston member.

4. The hydraulic damper according to claim 1, wherein said compression valve assembly cooperating with said at least one compression stop assembly includes a compression valve assembly of the piston assembly, and said pressure chamber is additionally defined by a guiding portion fixed on the piston rod, wherein the piston rod has at least one radial channel in fluid communication with said pressure chamber and normally disconnected from the compression chamber by a wall of the pin, wherein the pin has at least one axial channel in fluid communication with the compression chamber having an outlet distal to the activating tip of the pin normally closed by the wall of the piston rod, wherein said compression flow passages are disposed within the piston assembly, and wherein upon sliding of the pin inside the piston rod along a predetermined distance said at least one axial channel of the pin is in fluid communication with said at least one radial channel of the piston rod to generate pressure on said surface of said piston member.

5. The hydraulic damper according to claim 4, wherein said at least one axial channel has a form of a narrowed cross-section of said pin.

6. The hydraulic damper according to claim 1, wherein said compression valve assembly cooperating with said at least one compression stop assembly is installed within an adapter disposed between the base valve assembly and the compression chamber and comprising an axial opening for a flow of the working liquid through the base valve assembly between the compression chamber and the compensation chamber which is closable by the activating tip of the pin, and said pressure chamber is additionally defined by a guiding portion of said adapter, wherein the adapter has at least one radial channel in fluid communication with said pressure chamber and normally connected with the compression chamber, wherein said compression flow passages are disposed within a valve member fixed between said adapter and the main tube, wherein closing said axial opening by the activating tip and sliding of the pin inside the piston rod along a predetermined distance generates pressure on said surface of said piston member.

7. The hydraulic damper according to claim 6, wherein said adapter comprises a number of axial flow passages surrounding said guiding portion, and said valve member has a number of rebound flow passages covered in the compression chamber by at least one deflective or floating intake disk provided with a number of flow passages that allow the working liquid to flow to said compression flow passages during the compression stroke of the hydraulic damper.

8. The hydraulic damper according to claim 1, wherein the pin is biased by a spring disposed within an internal chamber in the piston rod.

9. The hydraulic damper according to claim 8, wherein the pin has an internal axial channel joining the compression chamber with said internal chamber in the piston rod.

10. The hydraulic damper according to claim 1, wherein the hydraulic damper is a motor vehicle suspension damper.

* * * * *